Aug. 25, 1959  M. C. BURR  2,901,300
CONTROLLED CLEARANCE CARBON BEARINGS
Filed April 25, 1956

INVENTOR
Myrtice C. Burr
BY McCoy, Greene & Te Grotenhuis
ATTORNEYS

United States Patent Office 2,901,300
Patented Aug. 25, 1959

2,901,300

CONTROLLED CLEARANCE CARBON BEARINGS

Myrtice C. Burr, St. Marys, Pa., assignor, by mesne assignments, to Pure Carbon Company, Inc., St. Marys, Pa., a corporation of Pennsylvania Application April 25, 1956, Serial No. 580,552

4 Claims. (Cl. 308—238)

This invention relates to bearings of the bonded carbon liner type in which the clearance between the shaft and a one-piece liner sleeve which has a low coefficient of thermal expansion as compared to that of the shaft is so controlled as to maintain a proper working clearance at all temperatures of operation.

Carbon and carbon graphite compositions have a coefficient of thermal expansion that is much lower than that of metals used for shafts, and bearing elements made of such compositions have usually been made in the form of separately mounted segments or shoes in order to avoid binding at high temperatures of operation.

In some instances carbon graphite bushings have been press fitted or shrink fitted in a massive metal housing in such manner that the material of the bushing is compressed and is held under compression by the housing. In such bearings some of the compression will be relieved and the bushing will expand slightly when the metal housing and shaft are expanded by heat. It is necessary, however, that the housing be rather massive in order to provide the strength necessary to hold the carbon graphite bushing under compression and the bushing must be relatively thick to permit sufficient compression to compensate for an appreciable expansion of the shaft.

In the bearing of the present invention a one-piece liner of the bonded carbon type is employed which is in the form of a longitudinally split sleeve which is mounted within an outer housing or shell made of a material having a higher coefficient of thermal expansion than the liner. The liner is pre-stressed to follow the thermal expansion of the housing and has sufficient resiliency to maintain engagement with the interior of the shell throughout the range of thermal expansion to which the shell is subjected in service.

By reason of its greater expansibility a split resilient carbon graphite bearing sleeve or liner may be relatively thin and will expand with the housing to a much greater extent than a circumferentially continuous carbon graphite bushing. Since the split liner exerts only a relatively small expansive thrust on the housing, it may be retained within a relatively light outer shell. For the reasons stated, the bearing of the present invention is compact, inexpensive and highly efficient.

If the coefficients of thermal expansion of the shaft and housing are substantially the same there will be only a slight increase in clearance at high operating temperatures, due to the lower rate of expansion of the liner, particularly when the liner is relatively thin. However, by forming the outer shell of a material having the proper coefficient of thermal expansion, a substantially constant working clearance may be maintained between the shaft and bearing liner throughout a wide range of temperatures. The dimensions and coefficients of thermal expansion of the shaft and liner being known, the coefficient of thermal expansion of a housing or shell which would maintain constant clearance between the shaft and the bearing liner can be readily computed and an alloy, a powdered metal mixture or other suitable material from which the housing or shell may be cast or molded, which will have a coefficient of thermal expansion that will very nearly approximate the computed figure can be selected.

It is an object of the invention to provide a bonded carbon bearing which is of simple, compact and inexpensive construction and which includes a one-piece bonded carbon bearing sleeve that is easily replaceable.

It is also an object of the invention to provide a bearing which has a one-piece bonded carbon liner sleeve that will adapt itself to a housing having a much higher coefficient of thermal expansion as the temperature of operation of the bearing increases or decreases.

A further object of the invention is to provide a bearing assembly which has a split, expansible carbon liner sleeve which has a coefficient of thermal expansion which is low with respect to the shaft and outer shell and in which the outer shell has a coefficient of thermal expansion so related to that of the shaft and the bearing liner that a substantially constant clearance is maintained between the bearing liner and shaft at all temperatures of operation within a wide range.

Reference should be had to the accompanying drawings forming a part of this specification in which.

Figure 1:
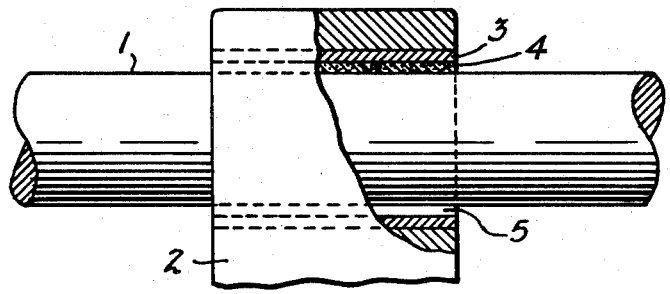
Figure 1 is a side elevation of a shaft and bearing assembly embodying the invention, the bearing being partially broken away and shown in axial section.
Figure 2:
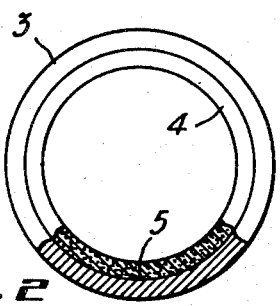
Fig. 2 is an end elevation of the bearing shown in Fig. 1 with a part broken away and shown in transverse section.
Figure 3:
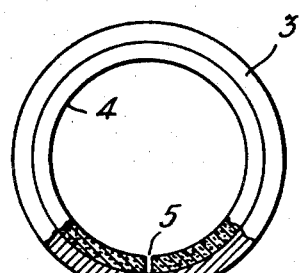
Fig. 3 is a view similar to Fig. 2, showing the bearing expanded by heat.
Figure 4:
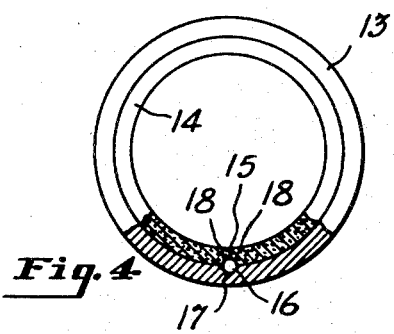
Figure 5:
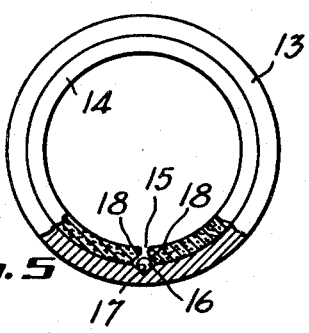
Figure 6:
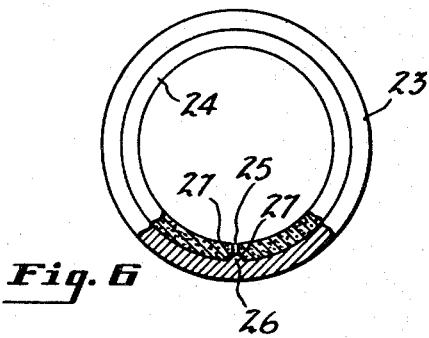
Figure 7:
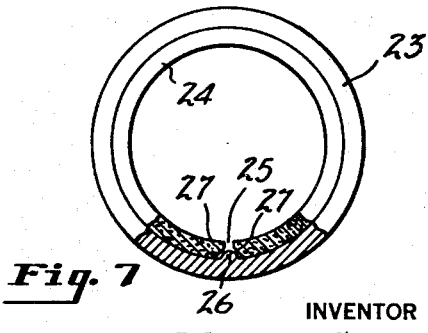

Figs. 4 and 5 are views similar to Figs. 2 and 3, showing a bearing in which the liner is keyed to the housing or outer shell; and Figs. 6 and 7 are views similar to Figs. 2 and 3, showing the keyed bearing provided with an oil groove.

In the accompanying drawings the bearing is shown applied to a shaft 1 and may be mounted in a suitable pedestal or other support 2. As herein shown, the bearing comprises an outer tubular shell 3 and a cylindrical liner sleeve 4 that has a longitudinal split 5. The liner sleeve 4 is formed of a bonded carbon composition made by extruding or molding a plastic composition composed of finely divided carbon combined with suitable liquids and binding materials which provide a plastic mix. After the cylindrical liner has been molded or extruded, it is hardened by baking.

The finely divided materials which are bonded together to form the bearing liner, are composed mainly of carbon or carbon and graphite and may include powdered metal. A suitable binder such as pitch, tar or synthetic resin is employed and sufficient solvent included in the mix to impart the plasticity necessary for molding or extruding. By varying the amount of volatile material in the plastic mix, the porosity of the composition may be regulated and, by varying the proportion of graphite, the liner may be relatively hard or relatively soft and, by providing sufficient resilient binder, a liner may be provided which possesses the resiliency required to maintain it in engagement with the outer shell throughout the range of temperatures to which the bearing may be subjected in service.

In making a liner, a cylindrical sleeve of the proper length is first formed and this sleeve is machined internally and externally to cylindrical form, the external diameter of the liner sleeve being slightly greater than the internal diameter of the outer shell in which the liner is to be placed. The liner sleeve is then slit longitudinally by means of a suitable cutter which provides a slot of sufficient width to permit the liner to be contracted sufficiently to permit it to be inserted within the outer shell 3. The liner has a sufficient resiliency to exert an expansive thrust on the interior of the outer shell 3 as the outer shell is expanded by heat, the adjoining edges of the liner moving apart as the shell is expanded as shown in Fig. 3.

Since the coefficient of thermal expansion of the bonded carbon liner is less than one-half the coefficient of thermal expansion of a steel shaft, it is necessary for the liner to expand by its own resiliency as the shell is expanded in order to maintain a working clearance between the liner and shaft. If the coefficient of thermal expansion of the shaft 1 is substantially the same as that of the shell 3, and the liner wall is relatively thin, there will be only a very slight increase in the working clearance between the shaft and liner due to the expansion of the shell in service. If the diameter of the shaft and the coefficient of thermal expansion of the material of the shaft and the thickness of the liner and the coefficient of thermal expansion of the material of the liner are known, the thermal coefficient of expansion of an outer shell, which would maintain a constant clearance between the carbon liner and shaft, can be readily computed. For example, the coefficient of thermal expansion of a stainless steel shaft would be approximately $8.4 \times 10^{-6}$. The coefficient of thermal expansion of a typical bonded carbon liner sleeve would be about $2.5 \times 10^{-6}$. Assuming that the shaft is 1" in diameter and that the wall thickness of the carbon liner is $3/32$", the coefficient of thermal expansion of an outer shell which would maintain a constant clearance would be about $7.5 \times 10^{-6}$.

The various alloys or compositions having approximately the desired rate of thermal expansion can be used in making the outer shell, or various combinations of powdered metals may be used to mold an outer shell having the proper coefficient of thermal expansion.

The liner may, if desired, be keyed to the outer shell. As shown in Figs. 4 and 5, an outer shell 13 receives a molded carbon liner 14 which has a longitudinal split 15 and which is held against circumferential movement in the shell 13 by means of a key 16 that engages in an internal longitudinal groove 17 in the outer shell and which extends into a longitudinal recess in the liner that is formed by opposed beveled edges 18 of the liner.

The bearing may be provided with an oil groove by providing a longitudinal slit that is wider than is necessary to compensate for the differential expansion of the liner and shell. As shown in Figs. 6 and 7, an outer sleeve 23 receives a bonded carbon liner sleeve 24 which has a longitudinal split 25 wide enough to provide an oil groove at all temperatures of operation of the bearing. The shell 23 may be molded with an integral key 26 that is received in a recess formed by beveled edges 27 of the liner at the longitudinal split 25.

If desired, the bonded carbon liner may be made sufficiently porous to enable it to retain a considerable quantity of lubricant and may be impregnated with a suitable high melting point lubricant such as a wax. Also the liner may contain a large proportion of graphite which will act as a lubricant.

The bearing of the present invention can be easily assembled and worn liners can be quickly and easily replaced. The bearing, composed of a relatively thin outer shell and a relatively thin bonded carbon liner, is compact and inexpensive and, by maintaining proper working clearance at all temperatures of operation, wear on the liner is reduced to a minimum.

It is to be understood that in accordance with the provisions of the patent statutes, variations and modifications of the specific devices herein shown and described may be made without departing from the spirit of the invention.

What I claim is:

1. A bearing assembly comprising a shaft, a tubular outer shell and an inner one-piece bonded carbon liner sleeve that is longitudinally split, that is normally of an external diameter slightly greater than the internal diameter of said shell whereby said sleeve is prestressed upon insertion into said shell and exerts a radial expansive thrust thereon, said sleeve having a coefficient of thermal expansion that is low with respect to that of both said shaft and said shell and having sufficient resiliency to expand circumferentially with said shell and maintain a bearing clearance throughout the range of temperatures to which the bearing may be subjected in service.

2. A bearing such as defined in claim 1 in which said liner sleeve has a high graphite content.

3. A bearing such as defined in claim 1 in which said liner sleeve is porous and is impregnated with a lubricating material.

4. A bearing assembly comprising a shaft and a bearing that comprises an outer shell and a longitudinally split resilient one-piece bonded carbon liner sleeve press fitted in said shell and exerting an expansive thrust on said shell, said sleeve having a coefficient of thermal expansion that is materially less than the coefficient of thermal expansion of said shaft and said shell being formed of a material having a coefficient of thermal expansion such that a substantially constant bearing clearance is maintained throughout a wide range of operating temperatures.

References Cited in the file of this patent

UNITED STATES PATENTS

| 523,238 | Rarig | July 17, 1894 |
| 2,590,761 | Edgar | Mar. 25, 1952 |
| 2,627,443 | Becker | Feb. 3, 1953 |
| 2,691,814 | Tait | Oct. 19, 1954 |
| 2,713,525 | Hinman | July 19, 1955 |
| 2,755,825 | Van Deventer | July 24, 1956 |

FOREIGN PATENTS

| 24,495 | Great Britain | Nov. 14, 1908 |